US006748553B2

(12) United States Patent
McBride et al.

(10) Patent No.: US 6,748,553 B2
(45) Date of Patent: Jun. 8, 2004

(54) METHOD AND APPARATUS FOR DEFAULT FACTORY IMAGE RESTORATION OF A SYSTEM

(75) Inventors: Aaron A. McBride, Salt Lake City, UT (US); Matthew A. Schnoor, Salt Lake City, UT (US)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 09/752,547

(22) Filed: Dec. 27, 2000

(65) Prior Publication Data

US 2002/0083367 A1 Jun. 27, 2002

(51) Int. Cl.[7] .................................................. H02H 3/05
(52) U.S. Cl. ...................................................... 714/15
(58) Field of Search ............................. 714/15, 16, 20, 714/36, 37, 38, 2, 10

(56) References Cited

U.S. PATENT DOCUMENTS

| | | | | |
|---|---|---|---|---|
| 5,269,022 A | * | 12/1993 | Shinjo et al. | 713/2 |
| 5,469,573 A | * | 11/1995 | McGill et al. | 717/127 |
| 6,247,126 B1 | * | 6/2001 | Beelitz et al. | 713/1 |
| 6,289,449 B1 | * | 9/2001 | Aguilar et al. | 713/2 |
| 6,351,850 B1 | * | 2/2002 | van Gilluwe et al. | 717/175 |
| 6,535,998 B1 | * | 3/2003 | Cabrera et al. | 714/15 |

* cited by examiner

Primary Examiner—Dieu-Minh Le
(74) Attorney, Agent, or Firm—Blakely, Sokoloff, Taylor & Zafman LLP

(57) ABSTRACT

A method and apparatus for restoring a system including a hard drive having a main logical disk and a recovery local disk, to a pristine state. The method comprises installing a copy of the master boot record onto the main logical drive of the hard drive and installing operating system information from the recovery drive to the main drive. The method further comprises setting the master boot record to boot from the main local drive, and rebooting the system.

24 Claims, 5 Drawing Sheets

METHOD AND APPARATUS FOR DEFAULT FACTORY IMAGE RESTORATION OF A SYSTEM

BACKGROUND

Specialized computer systems are becoming more widespread. These computer systems are often referred to as appliances. Generally, these computer systems have a processor and a means of communicating with a user. A system may become corrupted by use over time, by downloading data that corrupts it, or for another reason. Furthermore, some devices are rented or leased. In either situation, the device should be reset, from its current state to an original state.

Typically, the end-user would have access to some form of mass-media peripheral like a CD-ROM, DVD-ROM, Zip Disk, etc. that may be used as a backup storage medium for a default factory image (DFI). Alternatively, the user may be able to fix the device using a network connection. The ability to reset the appliance to a DFI state becomes much more difficult when it is sealed without mass-media peripheral data resources. The ability to restore the appliance to a DFI state cannot depend upon network connectivity, since network connectivity may not be reliable. This compounds the problem because the end-user must have a way to initialize the process of restoring the DFI. For one embodiment, the only control points dedicated to the initialization of this functionality are those available via direct physical access to the appliance.

Backup and restore software, available from many vendors for many platforms. This software specializes in maintaining periodic "snapshots" of an already-installed and functional system. Backup software typically relies on an external storage medium to store the archived data, and restore software usually requires specialized agent software to manage the restoration process. There is no guarantee that the specific methods of restoring through this software will produce a system that boots and loads exactly as it did when it came from the factory.

One prior art mechanism of solving these types of problems in standard backup and restore software is using image-ghosting software. This software requires a very large media caching footprint, a peripheral storage device for installation, and a DOS based installation target for real-mode ghosting activities. This makes the solution prohibitively expensive for many uses.

Another prior art mechanism for solving this problem is remote installation software. This disaster recovery implementation requires network connectivity and Preboot Execution Environment (PXE) hardware supported boot functionality or similar Basic Input/Output System (BIOS) support. However, this solution cannot be used in a system that has been significantly damaged or where network connectivity is sporadic.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for restoring a computer system to a default factory image is discussed. Restoring the computer system is done by resetting the primary software stack for the entire appliance back to the original DFI (Default Factory Image). An appliance, for one embodiment, is a sealed computer system without video, mouse, keyboard, and data peripherals. The ability to reset the appliance to a DFI state is difficult when it is sealed without mass-media peripheral data resources. Once completed, the DFI reconstruction offers the end-user the same level of primary functionality and configuration state that the appliance offered when it was unpacked from its shipping container.

For one embodiment, primary functionality and configuration state are defined as the ability to boot into the appliance's default operating system, and load software, services, and functions necessary to support the appliance's primary directive. The primary functionality and configuration state may also include having the file systems including the contents and layout to support the operating system, the aforementioned services, default configuration data, and other files contributing to the appliance's primary directive. The primary configuration state also includes resetting the configuration files to the same state that they existed in prior to the first boot of the appliance.

The DFI reconstruction defined below has the ability to preserve the files and directories, as shipped from the factory. These attributes may include the binary contents of files, an identical layout of directory structure, user and group permissions associated with files and directories, special attributes of files and directories, date and time stamps of files and directories, and in cases where it has relevance, exact physical location of file data.

Figure 1:
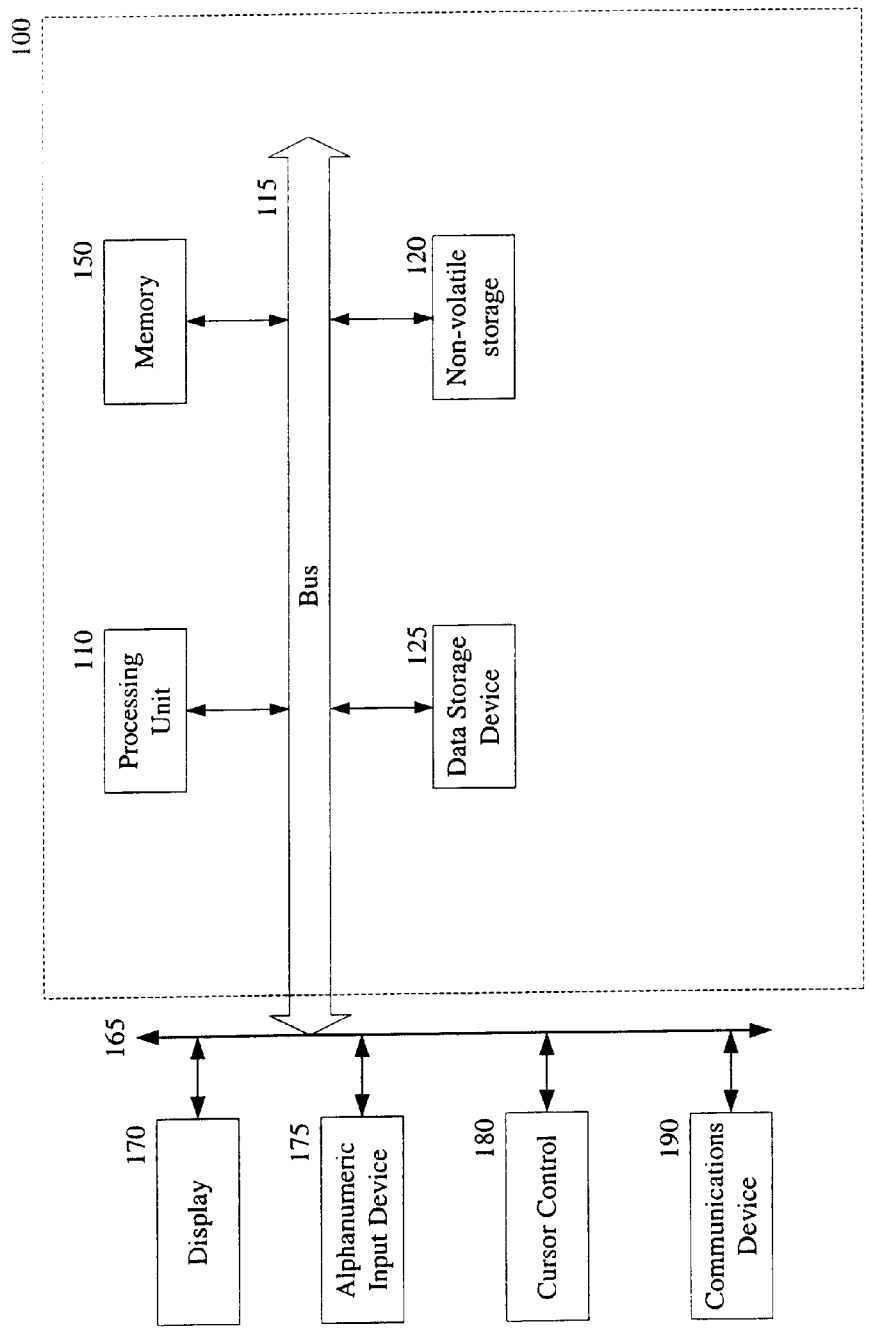
FIG. 1 is a block diagram of a computer system on which the present invention may be implemented.

FIG. 1 is one embodiment of a computer system that may be used with the present invention. It will be apparent to those of ordinary skill in the art, however that other alternative systems of various system architectures may also be used.

The data processing system illustrated in FIG. 1 includes a bus or other internal communication means 115 for communicating information, and a processor 110 coupled to the bus 115 for processing information. The system further comprises a random access memory (RAM) or other volatile storage device 150 (referred to as memory), coupled to bus 115 for storing information and instructions to be executed by processor 110. Main memory 150 also may be used for storing temporary variables or other intermediate information during execution of instructions by processor 110. The system also comprises a read only memory (ROM) and/or static storage device 120 coupled to bus 115 for storing static information and instructions for processor 110, and a data storage device 125 such as a magnetic disk or optical disk and its corresponding disk drive. Data storage device 125 is coupled to bus 115 for storing information and instructions.

The system may further be coupled to a display device 170, such as a cathode ray tube (CRT) or a liquid crystal display (LCD) coupled to bus 115 through bus 165 for displaying information to a computer user. An alphanumeric input device 175, including alphanumeric and other keys, may also be coupled to bus 115 through bus 165 for communicating information and command selections to processor 110. An additional user input device is cursor control device 180, such as a mouse, a trackball, stylus, or cursor direction keys coupled to bus 115 through bus 165 for communicating direction information and command selections to processor 110, and for controlling cursor movement on display device 170.

Another device, which may optionally be coupled to computer system 100, is a communication device 190 for accessing other nodes of a distributed system via a network. The communication device 190 may include any of a number of commercially available networking peripheral devices such as those used for coupling to an Ethernet, token ring, Internet, or wide area network. The communication device 190 may further be a null-modem connection, or any other mechanism that provides connectivity between the computer system 100 and the outside world. Note that any or all of the components of this system illustrated in FIG. 1 and associated hardware may be used in various embodiments of the present invention.

It will be appreciated by those of ordinary skill in the art that any configuration of the system may be used for various purposes according to the particular implementation. The control logic or software implementing the present invention can be stored in main memory 150, mass storage device 125, or other storage medium locally or remotely accessible to processor 110.

It will be apparent to those of ordinary skill in the art that the system, method, and process described herein can be implemented as software stored in main memory 150 or read only memory 120 and executed by processor 110. This control logic or software may also be resident on an article of manufacture comprising a computer readable medium having computer readable program code embodied therein and being readable by the mass storage device 125 and for causing the processor 110 to operate in accordance with the methods and teachings herein.

The present invention may also be embodied in a handheld or portable device containing a subset of the computer hardware components described above. For example, the handheld device may be configured to contain only the bus 115, the processor 110, and memory 150 and/or 125. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 110, a data storage device 125, a bus 115, and memory 150, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 240. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Figure 2:
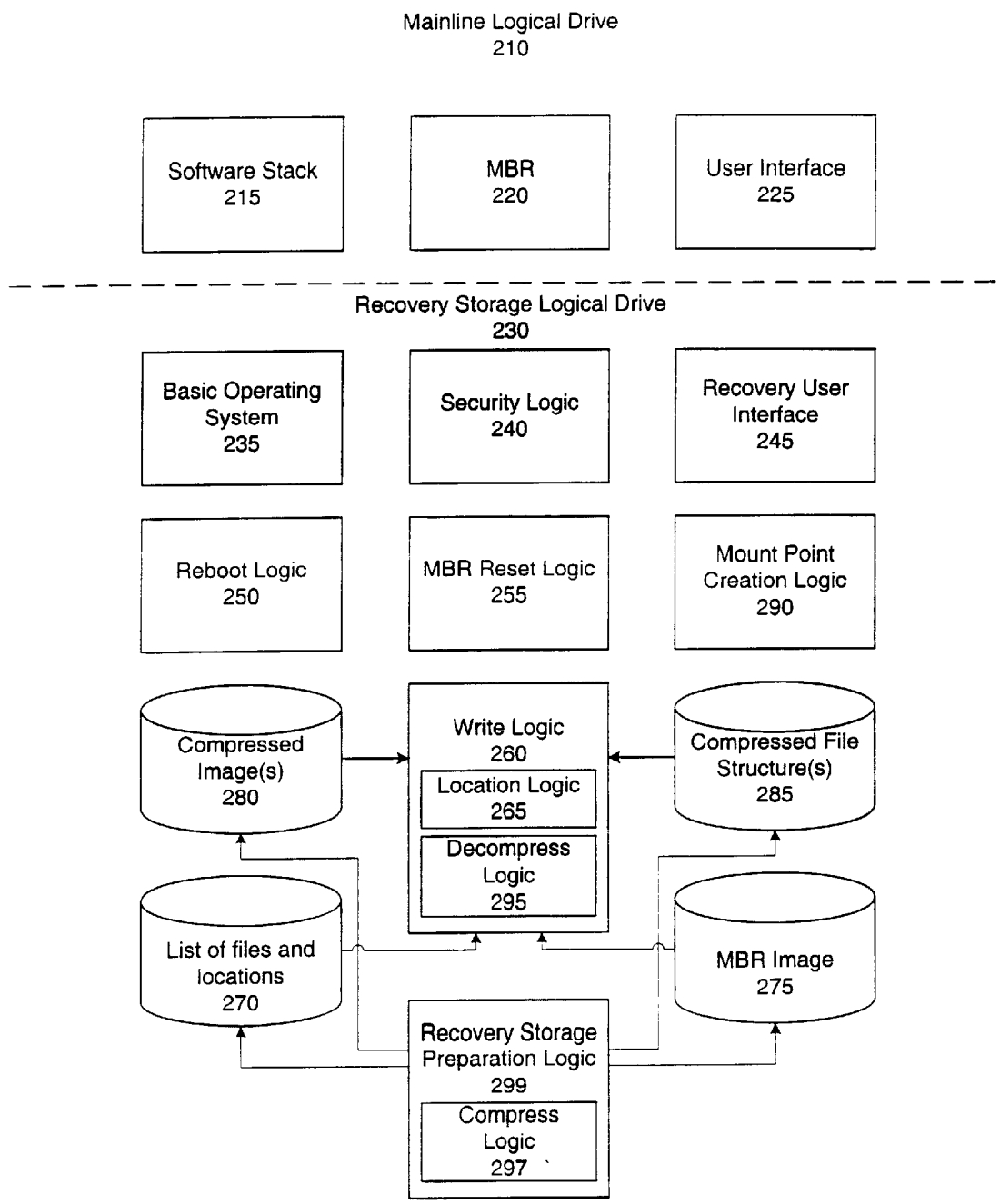
FIG. 2 is a block diagram of one embodiment of the default factory image restoration mechanism.

FIG. 2 is a block diagram of one embodiment of the default factory image restoration mechanism. The system includes two portions, a main logical drive 210 and a recovery logical drive 230. The term "logical drive" is used for the two main portions of the hard drive. This term replaces the traditional term "partition" since the term partition is used to indicate a section of main memory or mass storage that has been reserved for a particular application. However, the use of the term "logical drive" is not meant to limit this invention to the use of logical drives as defined by the Windows operating system, or to hard disk drives. Rather, any separate partition from which the system can be booted, is referred to, in this Specification, as a logical drive.

The system generally runs from the main logical drive 210. The main logical drive 210 includes a software stack 215, a master boot record 220, and a user interface 225. The software stack 215 is the software that is installed on the system at configuration. For one embodiment, the software stack 215 includes the basic operating system, and any necessary configuration data. Additional software, i.e. software that need not be on the computer for the computer to fully function need not be included in the software stack 215. As discussed above, for one embodiment, the computer system illustrated is a special-purpose system that is configured to operate in a particular way. For example, the system may be a web server. The software stack 215 includes all software that is necessary for the system to function in the manner designed.

The master boot record 220 is the first sector on the hard disk or other booting medium. It contains the "bootstrap." This program is called by the BIOS to load the actual operating system. This sector also contains a description of how the hard disk is divided into separate areas (partitions). This description is listed in the partition table. It contains one entry for each partition. The entry lists the location of the partition on the hard disk and the "type" of this partition. The format of this master boot record (bootstrap/partition table) is permanently defined and is generally required by all operating systems.

The user interface 225 permits communication between the user and the computer system. For one embodiment, the user interface 225 is a simple system that permits basic communication. For one embodiment, the user interface 225 permits the user to request a system recovery, which resets the system to its pristine just-out-of-the-box state.

The main logical drive 210 illustrated includes only the portions that are necessary for the system to function. There may be additional data, such as applications, files, configuration data, etc. on the main logical drive 210. However, since that data does not effect the functioning of the system, it is not included, for simplicity.

The recovery logical drive 230 is also on the hard drive. The recovery logical drive 230, for one embodiment, is considerably smaller than the main logical drive. For one embodiment, the recovery logical drive 230 is flexibly sized, such that it is just large enough to permit its functioning. Recovery logical drive 230 includes a basic operating system 235, such that the computer system can be booted from the recovery logical drive 230, even if the main logical drive 210 is completely non-functional.

For one embodiment, recovery logical drive 230 includes security logic 240. Security logic 240 is designed to prevent accidental access to, or changes to, the recovery logical drive 230. For one embodiment, a "root" user may be able to access the recovery logical drive 230. However, generally, security logic 240 prevents access to the memory and programs stored in the recovery logical drive 230. The use of such security, which may be encryption based, is known in the art.

The recovery logical drive 230, for one embodiment, also includes a recovery user interface 245. The recovery user interface 245 permits the user to request a recovery step, if he or she wishes to restore the system to its original state. For one embodiment, this user interface portion 245 of the system only permits the user to attempt to reboot to the main logical drive, or to restore the system. The user, for one embodiment, may not do anything else from this user interface 245. For one embodiment, if the user wishes to reset the system from the main logical drive, the main logical drive accesses the recovery UI 245 from the recovery logical drive 230.

Reboot logic 250 permits the system to reboot the computer, while MBR reset logic 255 sets the master boot record to boot either from the main logical drive 210 or from the recovery logical drive 230. Note that although reboot logic 250 and MBR reset logic 255 are illustrated in the recovery logical drive 230, they are also available on or to the main logical drive 210, to enable restoration to start from the main logical drive 210. This is shown in more detail with respect to FIG. 4.

The design of such dual-boot systems is known in the art. A standard dual boot format master boot record may be used for this. Reboot logic 250 reboots the system when the user requests it, or after full recovery, to shift the system from running in the recovery logical drive to running from the recovered main logical drive.

Write logic 260 writes the data from the recovery logical drive 230 to the main logical drive 210. This data includes the master boot record, which is moved from the MBR image 275 to its normal location on the main logical drive 210. Location logic 265 assists the write logic 260 in placing location critical files in the appropriate location. For example, the location of the MBR is fixed. Therefore, location logic 265 guides the write logic 260 to place the MBR recovered from MBR image 275 in the appropriate location. Write logic 260 similarly replaces the software stack 215 with copies from compressed image(s) and compressed file structure(s). The location and relationships of the images and file structures are identified in the list of files and locations 270. The list 270 identifies, in the appropriate order, what files should be placed where within the main logical drive 210.

Write logic 260 further includes decompress logic 295, which is used to decompress the compressed images 280, compressed file structures 285, and the compressed MBR image 275, prior to restoring them on the main logical drive 210. Mount point creation logic 290 creates mount points to appropriately interrelate files, if the file system supports partition mounting.

Recovery logical drive 230 further includes preparation logic 299, for one embodiment. Preparation logic 299 performs the operation to create the data in the recovery logical drive 230, to permit recovery. Preparation logic 299, for one embodiment, is automatically run when the system is installed. Preparation logic 299 creates compressed images and file structures of all of the important data on the main logical drive 210, and captures a copy of the MBR. For one embodiment, preparation logic 299 includes compression logic 297 to compress the images and file structures, as appropriate. The preparation logic 299 further creates the list of files and locations 270, which is used by write logic 260 to restore the system.

In this way, the recovery logical drive 230 of the computer system permits a computer system with no external access via network or externally mounted data drive to recover to its original factory status. This permits a system with a very limited user interface to be rebooted by a non-expert. Furthermore, this system may be useful for enterprises that rent out or otherwise make available for a limited time a computer system. For example, an Internet Service Provider (ISP) may rent out a server to a particular customer. When that customer stops using the server, the ISP can simply restore the server to its default factory image, without having to carefully erase and reset the system by hand.

Figure 3:
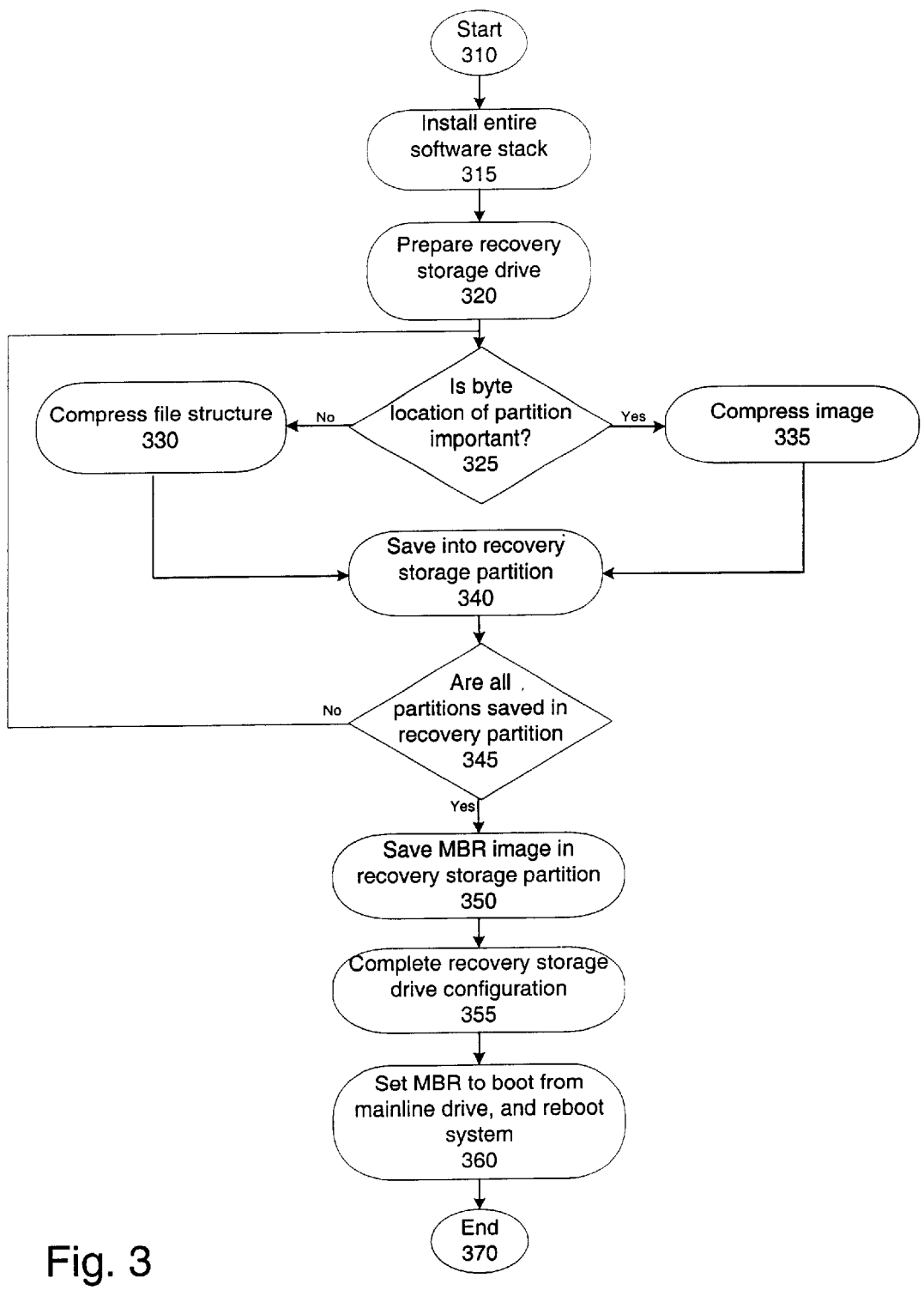
FIG. 3 is a flowchart of one embodiment of preparing a system to enable recovery.

FIG. 3 is a flowchart of one embodiment of preparing a system to enable recovery. The process starts at block 310. For one embodiment, the DFI logical drive and cache creation process is performed once at the factory. This phase of the process cannot be repeated by the end-user.

At block 315, the entire software stack is installed. For one embodiment, this is the standard configuration of the appliance. This consists of a core operating system along with an accompanying set of applications and utilities. This set of software defines the software stack for the appliance. For one embodiment, the operating system may be Linux. The software stack is installed on the main logical drive of the appliance. This does not affect, or touch, the recovery logical drive.

At block 320, the recovery storage logical drive is prepared. This logical drive is also referred to as the DFI logical drive, or second logical drive. For one embodiment, the preparation includes installing a mini-version of the operating system, and the basic files and utilities, to permit booting the appliance from the DFI logical drive. For one embodiment, the DFI logical drive is filled with an auxiliary version of the Linux OS along with a few extra utilities used for later DFI reconstruction. For one embodiment, the DFI logical drive OS is created prior to the installation of the appliance software stack, at block 315, and exists in a compressed image until it is decompressed and placed onto the DFI logical drive itself.

For one embodiment, this preparation includes uploading a list of files that are in the main logical drive, including the location of each of the files, and a definition of each of the partitions. This list of files is used by the DFI logical drive to evaluate and prepare each of the partitions for storage. For another embodiment, this file may be generated by the compression process described below. Thus, as each item is placed in the DFI logical drive, its identity and compression mechanism are added to the list. This list is later used for reconstruction, as will be described below.

At block 325, the process starts by evaluating a first partition that has not yet been stored in the second logical drive. At block 325, the process determines whether the byte location of the partition is important.

For one embodiment, the process evaluates whether the partition contains an OS partition type that is native to the appliance. If not, then the byte-based image methodology is used. Byte-based image creation will preserve the byte layout and file structure of the non-native OS providing an exact reconstruction. For one embodiment, the process evaluates whether the partition contains file images used by the MBR (Master Boot Record). In that case, the byte-based image methodology is used. Byte-based image creation will preserve the exact locations of files referenced by physical offset in the MBR. For one embodiment, the process further evaluates whether the partition is relatively small and/or is nearly full of data. If so, then byte-based image methodology is used. In this case, it may be more efficient to dump the entire partition as a whole rather than traverse the directory structure to create the file-based DFI.

If the partition is relatively large and/or nearly empty, then the file-based image methodology is used. In this case, the byte-based image creation will take longer to capture empty space on the partition that a directory traversal would accomplish on the same set of data. The byte-based method would also inherently cache extraneous data in unused disk blocks, thereby unnecessarily increasing the size of the resultant DFI. Additional data that falls into none of these groups is captured using byte-based image, for one embodiment.

If the byte location of the partition is found to be unimportant, the process continues to block 330, and the file structure is compressed. The process then returns to block 340. If the byte location of the partition is deemed important, the process continues to block 335, and the image is compressed. The process then returns to block 340.

At block 340, the compressed image or compressed file structure is saved into the DFI logical drive.

At block 345, the process determines whether all of the partitions have been saved in the DFI logical drive. If not all partitions have yet been saved, the process returns to block 325, to evaluate the next partition. Otherwise, the process continues to block 350.

For one embodiment, in an appliance using the Linux OS, the partitions consist of:
1. the/boot partition, cached using the byte-based image technique.
2. the DOS derivative partition, cached using the byte-based image technique.
3. the (root) partition, cached using the file-based image technique.
4. the/home partition, cached using the file-based image technique.
5. the/var partition, cached using the file-based image technique.

For one embodiment, the DFI logical drive includes the definition of the main logical drive, which permits this determination.

It should be noted that this invention includes the extension of this type of evaluation to an appliance using another type of operating system. One skilled in the art understands in light of this description how such an extension should take place.

At block 350, the master boot record MBR is saved in the DFI logical drive. For one embodiment, the MBR is saved as a compressed image, since its location is important.

At block 355, the recovery storage logical drive configuration is completed. For one embodiment, this includes verifying that all files needed to reset the system have been successfully stored in the DFI logical drive. For one embodiment, this may further include verification that the compression was successful, and the MBR has been successfully saved.

At block 360, the MBR on the main logical drive is set to boot from the main logical drive, and the system is rebooted. After this DFI preparation phase one is complete, normal operation of the appliance is possible. The appliance may now be shipped to the user.

Figure 4A:
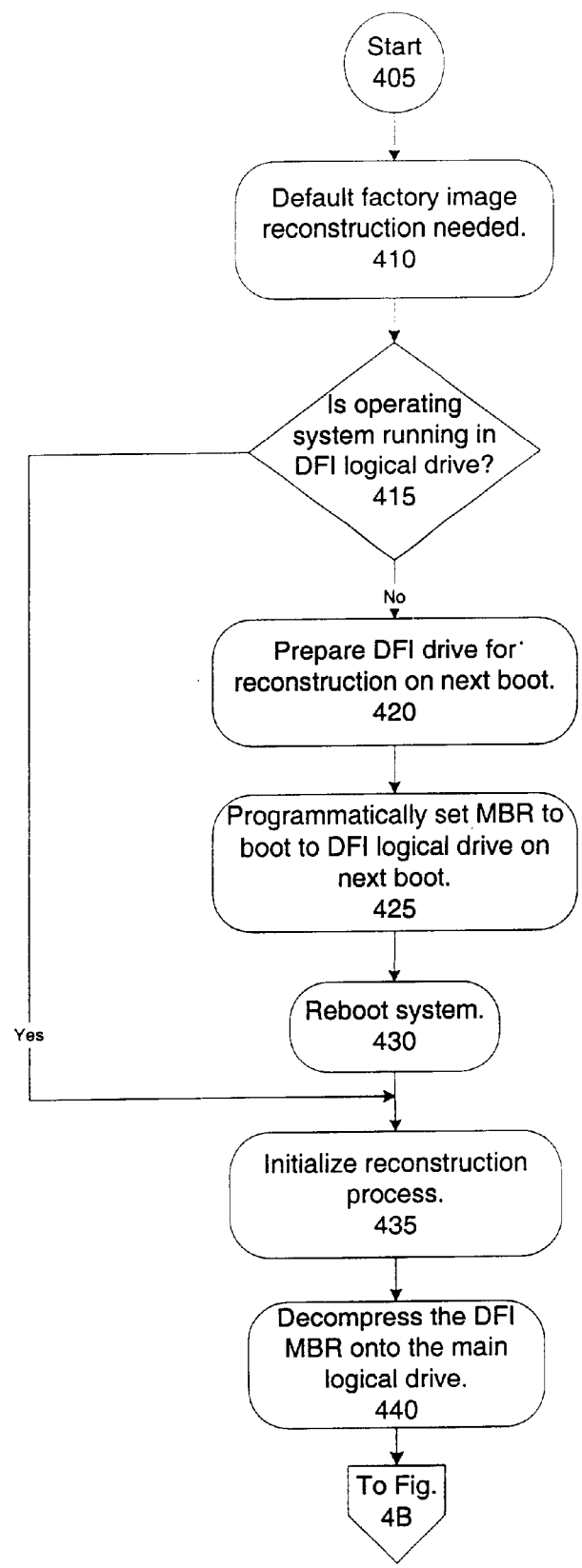
FIGS. 4A and B are a flowchart of one embodiment of executing a recovery procedure.
Figure 4B:
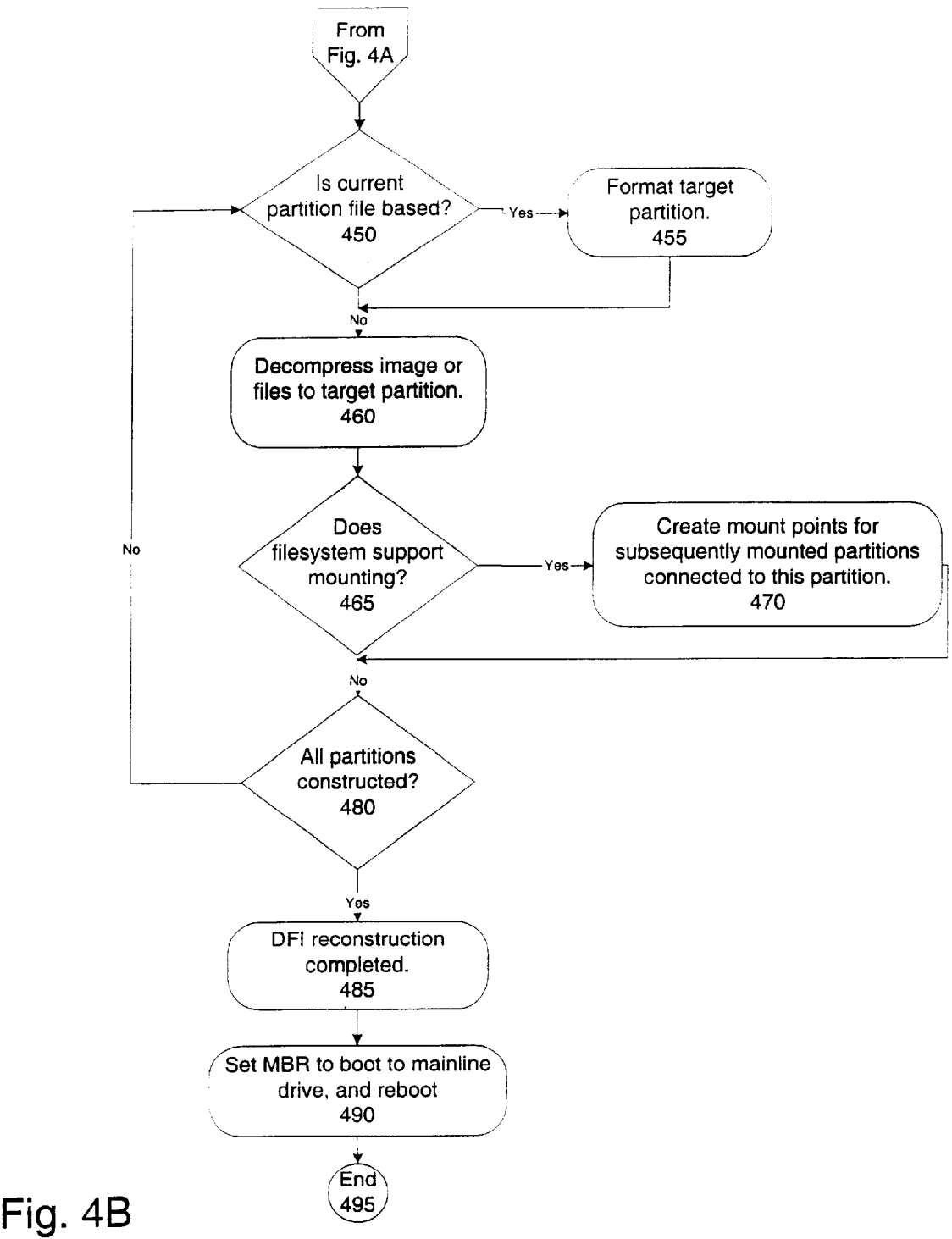

FIGS. 4A and B are a flowchart of one embodiment of executing a recovery procedure. The process starts at block 405. For one embodiment, this process is initiated by the end-user. Reasons for initializing the reconstruction process are varied. The two most common use models are 1) disaster recovery, and 2) appliance recycling. At block 410, the system determines that a default factory image (DFI) reconstruction has been requested. This is generally in response to a user selecting the reconstruction option. For one embodiment, the user may navigate to the reconstruction option on the user interface. For another embodiment, if the appliance was broken, and the system is running from the DFI logical drive, the user may only be given the option of DFI reconstruction, or attempted reboot to the main logical drive. In either case, however, the user selects the DFI reconstruction option, to initiate this process.

At block 415, the process determines whether the operating system is currently running from the DFI logical drive, or from the main logical drive. If the OS is running from the DFI logical drive, the process continues directly to block 435. Otherwise, the process continues to block 420.

At block 420, the DFI logical drive is prepared for reconstruction the next reboot. The reconstruction process takes place from the DFI logical drive. This allows complete and total regeneration of the participating partitions from the DFI logical drive without having to work around locked OS files such as kernel, libraries, drivers, etc. When initializing from the main logical drive, the DFI logical drive is prepared to perform the reconstruction process automatically. This means that the main logical drive has access to the DFI logical drive files.

For one embodiment, this includes setting the display to show an informative message indicating the appliance is about to be reset to a factory default image and that the appliance will reboot. For one embodiment, the system further disables the LCD menu system from automatically starting up on the DFI logical drive. The process further includes seeding the initialization scripts for the DFI logical drive with the reconstruction program.

At block 425, the master boot record is set to boot to the DFI logical drive on the next reboot. For one embodiment, in a Linux OS, the system uses LILO (Linux Loader) to set the MBR to boot to the DFI logical drive on the next boot.

At block 430, the process reboots the appliance.

At block 435, the reconstruction process is initialized. For one embodiment, this process includes setting the LCD display to show an informative message indicating that the reconstruction process is in progress, and calling the reconstruction program.

At block 440, the copy of the master boot record in the DFI logical drive is decompressed onto the main logical drive. This replaces the original MBR, which may be corrupted, with a copy of the MBR in its pristine state.

At block 450, the process determines whether the current partition about to be moved to the main logical drive is file based or image based. As discussed above, the master list of files not only determines in what order the partitions are decompressed and moved to the main logical drive, but what type of compression was used.

If the partition is file based, the process continues to block 455, and the target partition is formatted. The process then continues to block 460. If the partition was not file based, i.e. was image based, the process continues directly to block 460.

At block 460, the image or file structure is decompressed to the target partition in the main logical drive. Depending on whether the data was identified as location critical or not, the data is either placed in the identified location, or in the next available location.

At block 465, the process determines whether the file system supports mounting. Mounting is the ability to define a root partition and a relationship between the root partition and child partitions associated with the root partition. If mounting is supported, the process continues to block 470. At block 470, mount points are created for subsequently mounted partitions that are coupled to this partition. This defines the relationship between the currently decompressing partition, and subsequently moved partitions. The process then continues to block 480. If mounting is not supported, the process continues directly to block 480.

At block 480, the process determines whether all partitions have been reconstructed. If not, the process returns to block 450, to evaluate the next partition, to determine whether it is file based or not. If all partitions have been reconstructed on the main logical drive, the process continues to block 485.

At block 485, the DFI reconstruction is completed. Completing the reconstruction includes removing the reconstruction program hook from the initialization scripts for the DFI logical drive. For one embodiment, the completion includes replacing the DFI logical drive front panel LCD splash screen with the original appliance splash screen, and enabling the LCD menu system to automatically start on the DFI logical drive. The process may further include displaying a message on the LCD indicating the process is complete and that the appliance will reboot.

At block 490, the master boot record on the main logical drive is set to reboot from the main logical drive, and the appliance is rebooted. At this point, the appliance has been restored to its pristine state, and awaits user input. Note that this process effectively wipes all user information from the main logical drive. Therefore, the user may, at this point, need to enter use-specific data. For example, if the appliance is a web server, the user may need to enter the IP address, and other configuration information, prior to be able to use the appliance.

The above-described process, once completed, offers the end-user the same level of primary functionality and configuration state that the appliance offered when it was unpacked from its shipping container. This is advantageous in various situations.

A core idiom of an appliance is that software and hardware must work consistently and without significant error for the life of the product. A significant failure in either portion of the appliance will render the product useless to the end-user. The ability to restore the appliance to a good known state is core to the disaster recovery protocol. It prevents the end-user from having to send the appliance back to the vendor for a replacement. This significantly reduces the customer support costs incurred by the vendor for users who accidentally or willingly render their appliance inoperable.

Another core concept of the appliance is the need to be able to reuse and/or recycle the appliance without support from the vendor. The end-user is able to easily reset the appliance to a factory default state, or wipe the slate clean, in order to guarantee a pure working basis upon which to begin rebuilding. Having the ability to restore the appliance to a clean factory installed state prevents the user from having to send it back to the vendor for service.

One distinct side effect of this functionality is that all user data is lost once the DFI process begins, since the device is restored to its out-of-the-box purity. This is advantageous as it will remove the cause of any malfunction, and restore the pristine appliance that the user purchased.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of restoring a computer system comprising:
   installing a copy of a master boot record from a recovery logical drive onto a main logical drive of the computer system;
   installing operating system information from the recovery logical drive to the main logical drive;
   setting the master boot record to boot from the main logical drive; and
   rebooting the computer system, thereby restoring the main logical drive to a default factory image.

2. The method of claim 1, wherein the operating system information is an original default factory image of a primary software stack of the computer system.

3. The method of claim 2, further comprising readying the computer system for restoration, the readying comprising, prior to the computer system being used:
   capturing an image of the primary software stack of the computer system; and
   storing the image on the recovery logical drive.

4. The method of claim 3, further comprising:
   compressing the image, prior to storing it.

5. The method of claim 3, further comprising:
   determining if a partition in the primary software stack is location critical; and
   if the partition is location critical, compressing the image, and saving the compressed image into the recovery logical drive.

6. The method of claim 3, comprising:
   determining if a partition in the primary software stack is location critical; and
   if the partition is not location critical, compressing a file structure of the partition, and saving the compressed file structure into the recovery logical drive.

7. The method of claim 1, further comprising:
   determining if the computer system is operating from the main logical drive or the recovery logical drive; and
   if the computer system is running in the recovery logical drive, proceeding with installation of the main boot record to the main logical drive.

8. The method of claim 7, further comprising if the computer system is running in the main logical drive,
   setting the main boot record to boot from the recovery logical drive; and
   rebooting the computer system.

9. The method of claim 8, further comprising preparing the recovery logical drive for reconstruction on a next reboot.

10. The method of claim 9, wherein preparing the recovery logical drive comprises:
    preparing a user interface on the recovery logical drive; and
    setting up scripts to run without a user interface.

11. The method of claim 1, wherein the main logical drive and the recovery logical drive are partitions of a single hard drive.

12. An apparatus to restore a computer system comprising:
- a main logical drive including a primary software stack;
- a recovery storage logical drive comprising:
  - a basic operating system to permit booting from the recovery storage logical drive;
  - a write logic to move a new copy of the master boot record onto the main logical drive;
  - the write logic further to install a copy of the software stack from the recovery storage logical drive to the main logical drive;
  - a master boot record reset logic to set the new copy of the master boot record to boot from the main logical drive; and
  - a reboot logic to reboot the appliance, the new copy master boot record causing the appliance to reboot from the main logical drive, with a software stack and master boot record restored to a default factory image.

13. The apparatus of claim 12, wherein the operating system information is an original default factory image of the primary software stack of the computer system.

14. The apparatus of claim 12, further comprising:
- a recovery logical drive preparation logic to ready the appliance for restoration, the readying comprising, prior to the computer system being used capturing an image of the primary software stack of the computer system, and storing the image in the recovery logical drive.

15. The apparatus of claim 14, further comprising a compress logic to compress the image, prior to storing it.

16. The apparatus of claim 14, wherein the recovery logical drive preparation logic is further to determine if a file in the primary software stack is location critical, and if the file is location critical, compressing the image; and
- a compressed image memory to store the compressed image in the recovery storage logical drive.

17. The apparatus of claim 14, wherein the recovery logical drive preparation logic is further to determine if a file in the primary software stack is location critical, and if the file is not location critical, compressing the file system; and
- a compressed file system memory to store the compressed file system in the recovery storage logical drive.

18. The apparatus of claim 12, further comprising:
- the recovery storage logical drive further to determine if the computer system is operating from the main logical drive or the recovery storage logical drive, on receiving a reset signal; and
- the write logic to proceed with decompression of the main boot record onto the main logical drive, if the computer system is running in the recovery storage logical drive.

19. The apparatus of claim 18, further comprising if the computer system is running in the first logical drive,
- an MBR reset logic to set the main boot record to boot from the recovery storage logical drive; and
- the reboot logic to reboot the appliance.

20. The apparatus of claim 19, further comprising the recovery storage logical drive to prepare for reconstruction on a next reboot.

21. The apparatus of claim 20, further comprising:
- a recovery user interface to indicate to the user that the recovery is about to proceed; and
- a basic operating system in the recovery storage logical drive to set up scripts to run the recovery process without a user interface.

22. A machine-readable medium that provides instructions, which when executed by a machine, cause said machine to perform operations comprising:
- installing a copy of the master boot record onto the main logical drive of the hard drive;
- installing operating system information from the recovery logical drive to the main logical drive;
- setting the master boot record to boot from the main logical drive; and
- rebooting the computer system, the installation having restored the computer system to the default factory image.

23. The machine-readable medium of claim 22, wherein the master boot record is restored from the recovery logical drive.

24. The machine readable medium of claim 22, wherein the operating system information is an original default factory image of a primary software stack of the computer system.

* * * * *

UNITED STATES PATENT AND TRADEMARK OFFICE
CERTIFICATE OF CORRECTION

PATENT NO. : 6,748,553 B2
DATED : June 8, 2004
INVENTOR(S) : McBride et al.

It is certified that error appears in the above-identified patent and that said Letters Patent is hereby corrected as shown below:

<u>Column 11,</u>
Line 19, insert -- of the --.

Signed and Sealed this

Thirty-first Day of August, 2004

JON W. DUDAS
*Director of the United States Patent and Trademark Office*